UNITED STATES PATENT OFFICE.

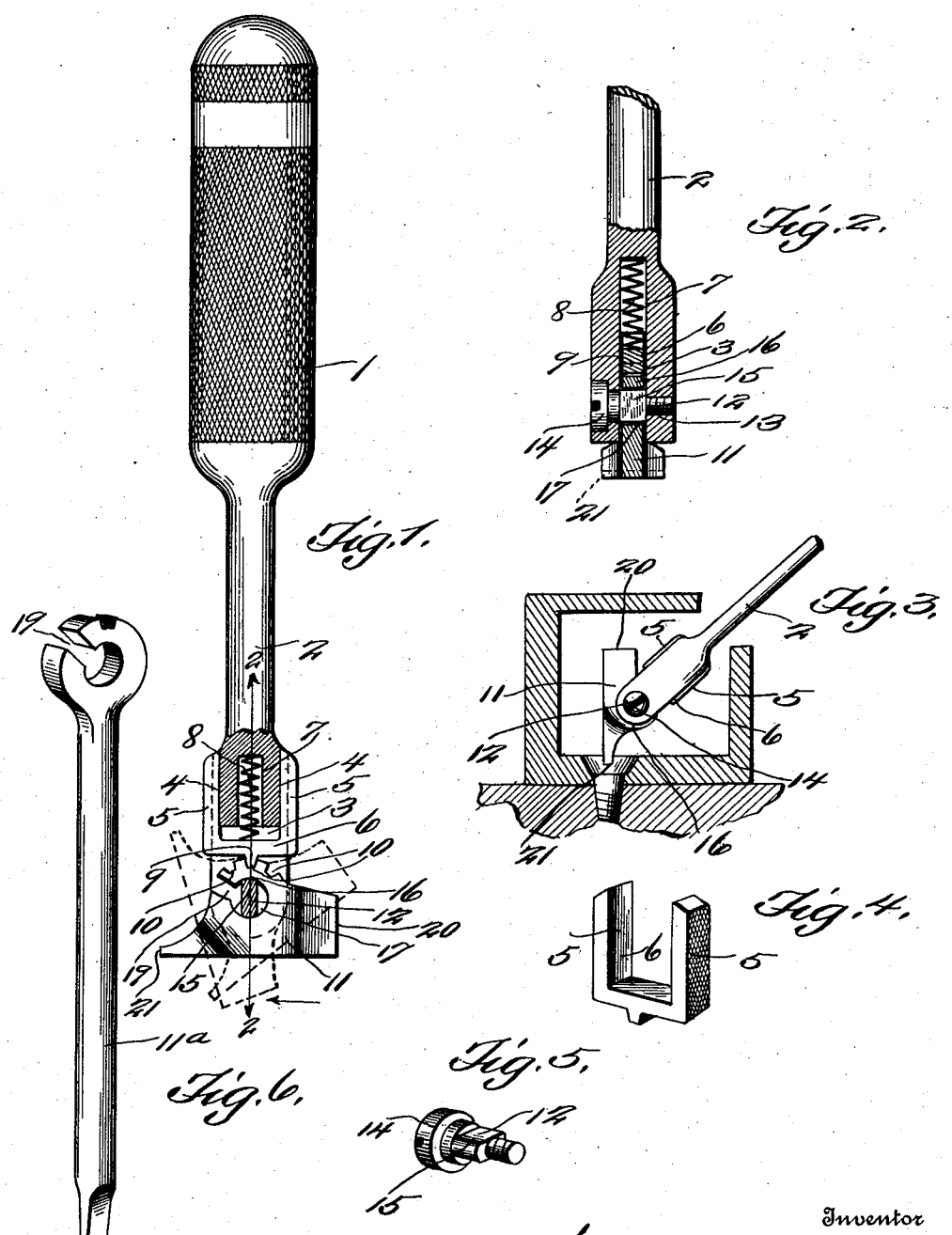

AUGUST HOLMQUIST, OF HOOPESTON, ILLINOIS.

SCREW-DRIVER.

1,010,631.   Specification of Letters Patent.   Patented Dec. 5, 1911.

Application filed July 1, 1911. Serial No. 636,330.

*To all whom it may concern:*

Be it known that I, AUGUST HOLMQUIST, a citizen of the United States, residing at Hoopeston, in the county of Vermilion and State of Illinois, have invented a new and useful Screw-Driver; and I do hereby declare the following to be a full, clear, and exact description of the invention, such as will enable others skilled in the art to which it appertains to make and use the same.

This invention relates to a new and useful screw driver.

The invention in its broadest scope aims as its primary object, to provide a screw driver having a double screw driver blade, capable of being adjusted in several different positions, thus enabling a workman to drive a screw at locations, at which it is impossible to drive a screw by the ordinary straight screw driver, as shown in one of the figures of the drawings.

A further feature of the invention is to supply the screw driver with more than one blade.

A further feature of the invention is to construct a screw driver, so as to permit the blade to be quickly and easily attached or detached.

A further feature of the invention is to provide the screw driver shank with a bifurcated end having a pivot pin extending transversely thereof, which pin is provided with two flattened sides substantially at its central portion, so as to receive the blade, whereby the blade may be adjusted upon the pivot pin. The blade is provided with a semi-circular head having annularly arranged notches, any one of which being designed to receive a lug of a spring tensioned U-shaped slide mounted in guides of the shank of the screw driver handle, thus providing novel means for holding the blade in various adjusted positions.

The drawings disclose only certain features of the invention, but in practical fields these features may necessitate alterations, to which the applicant is entitled, provided the alterations are comprehended within the scope of what is claimed.

The invention comprises further features and combination of parts, as hereinafter set forth, shown in the drawings and claimed.

In the drawings:—Figure 1 is a view in elevation, and partly in section, showing a screw driver constructed in accordance with the invention. Fig. 2 is a sectional view on line 2—2 of Fig. 1. Fig. 3 is a view in side elevation of the screw driver, at right angles to that shown in Fig. 1, showing the manner in which a screw may be driven in place, which could not be accomplished by the ordinary straight screw driver. Fig. 4 is a detail view of the spring tension slide. Fig. 5 is a detail view of the pivot pin for the screw driver blades. Fig. 6 is a detail view of a different form of a screw driver blade.

It is to be understood that other forms of blades may be used to as good advantage as those illustrated in the drawing.

Referring more especially to the drawings 1 designates the handle of the device, while 2 denotes the shank. The lower portion of the shank is bifurcated, as shown at 3 and adjoining the bifurcation are the guide grooves 4. Arranged in the guide grooves are the side portions 5 of the U-shaped slide 6. Arranged in a bore 7 of the shank is a spring 8, which acts between the inner portion of the bore and the slide, in order to hold the lug 9 in engagement with any one of the notches 10 of the screw driver blade 11, in order to hold the blade in adjusted positions upon the pivot pin 12. The pivot pin 12 extends transversely of the free ends of the bifurcated portion, as shown. One end of the pivot pin is threaded into one of the free ends of the bifurcated portion as shown at 13, thus constituting means for holding the pin in position securely. The pin, between the threaded portion thereof and the head 14, is provided with a flattened central portion 15, which, when the parts of the screw driver are assembled, is arranged centrally of the bifurcated portion. The screw driver blade, as shown in Figs. 1, 2 and 3 is provided with a substantially semi-circular head 16, in which the notches 10 are annularly arranged. This head has a central opening 17, to receive the flattened central portion 15 of the pivot pin. By this construction the blade may be adjusted in different positions upon the pin, and held in such positions, by means of the lug 9 of the U-shaped slide and any one of the notches 10. To permit the central opening 17 to receive the central portion of the pivot pin, the head of the blade is provided with an opening or cut away portion 19, extending radially from the central opening 17, so as to permit of the passage of the central portion of the pivot pin therethrough.

The screw driver blade as shown in Figs. 1, 2 and 3 is provided with two screw engaging ends 20 and 21, extending at right angles to one another, thus enabling a workman, after turning a screw a short distance with the screw engaging end 21, to adjust or reverse the position of the blade, so as to engage the screw with the end 20, whereby the screw may be driven home. When desired the blade shown in Figs. 1, 2 and 3, may be dispensed with, and the blade shown in Fig. 6 used instead.

By pushing the slide against the action of the spring 8, in the direction of the handle 1, the blade may be adjusted, or attached or detached.

From the foregoing it will be noted that there has been produced a novel, simple and efficient screw driver, and one which has been found to be practicable.

The invention having been set forth, what is claimed as new and useful is:—

In a screw driver, a shank having bifurcated ends and provided with guides on two of the sides adjoining the bifurcation, a blade pivoted in the bifurcation and provided with teeth, a U-shaped slide arranged between the blade and the inner wall of the bifurcation with the arms of the slide operating in the guides, the slide having a lug to coöperate with the teeth of the blade for holding the blade in adjusted positions the shank having a hollow bore between the guides, and a spring arranged in the bore and acting on the slide for holding the lug and teeth in coöperation.

In testimony whereof I have signed my name to this specification in the presence of two subscribing witnesses.

AUGUST HOLMQUIST.

Witnesses:
GEORGE KACHELE,
MARK W. CARDIFF.

Copies of this patent may be obtained for five cents each, by addressing the "Commissioner of Patents, Washington, D. C."